United States Patent [19]

Bougon et al.

[11] 4,195,911

[45] Apr. 1, 1980

[54] PANORAMIC IMAGE GENERATING SYSTEM

[75] Inventors: Pierre P. A. Bougon, Elancourt; Alain R. A. Parmentier, Palaiseau; Pierre M. Weiss, Maurepas, all of France

[73] Assignee: Le Materiel Telephonique, Boulogne-Billancourt, France

[21] Appl. No.: 818,413

[22] Filed: Jul. 25, 1977

[30] Foreign Application Priority Data

Jul. 19, 1976 [FR] France ............................... 76 23181

[51] Int. Cl.² ............................................. G02B 27/14
[52] U.S. Cl. .................................................. 350/171
[58] Field of Search ................. 350/171, 174, 55, 112, 350/198, 182, 200; 35/11 A, 10.2; 358/103; 353/111

[56] References Cited

U.S. PATENT DOCUMENTS

| 2,664,024 | 12/1953 | Hansen | 350/112 |
| 3,073,210 | 1/1963 | Packard | 350/112 |
| 3,203,328 | 8/1965 | Brueggemann | 350/200 |
| 3,368,448 | 2/1968 | Guttmann | 350/174 |
| 3,659,920 | 5/1972 | McGleasson | 350/174 |
| 3,785,715 | 1/1974 | Mecklenborg | 350/174 |
| 4,026,038 | 5/1977 | Sunter et al. | 35/11 A |

Primary Examiner—F. L. Evans
Assistant Examiner—B. W. de los Reyes
Attorney, Agent, or Firm—Roland Plottel

[57] ABSTRACT

A continuous panoramic image seen at infinity from an observation space E is obtained from a prismatic image whose facets consist of alternate and edge-to-edge real images I11, I12, ... and virtual images I21, 22, ..., and by reflection of this prismatic image in a set of sperical concave mirrors MC1, MC2, ... forming a reflection area.

The real images are produced by a first set of image generators M11, M12, ... The virtual images are the conjugates by reflection in the semi-transparent plane mirrors L1, L2, ... of images I21, I22, ... produced by a second set of image generators M21, M22, ... Amongst other applications, that of ship-control training equipment.

4 Claims, 8 Drawing Figures

PANORAMIC IMAGE GENERATING SYSTEM

The present invention relates to a panoramic image generating system intended amongst other applications for ship control training devices.

The image generating system according to the invention is generally concerned with the generation of an image having a wide angle of view and seen from a great distance.

An important application of this system is the simulation of panoramic views for equipment intended for training in activities implying all-round and long distance vision.

The principle of training systems is not new. For reasons of cost, danger, inconvenience or unavailableness, practical training in the control of vehicles or industrial equipment is not always given by means of the actual vehicles or equipment, but with the use of specially designed training systems.

The image generating system according to the invention is thus particularly concerned with the simulation of panoramic views for systems intended for training in the control of ships.

Modern large displacement and large size ships possess particular sea-going characteristics and can be operated only by appropriately trained personnel. Much of this training can be performed conveniently and at lower cost on land by means of training simulators. These simulators reproduce as closely as possible the control bridges of ships. They possess equipment simulating real navigation equipment with which trainees practise and in complete safety learn to handle difficult situations likely to arise in reality. These control stations can be subjected to artificial motion similar to that of real ships and determined by computers as a function of the manoeuvres performed and external conditions (current, wind direction and windspeed), these conditions being preprogrammed or selected by an instructor during the execution of an exercise.

The actual control of a ship is nevertheless and above all based on external vision for evaluating the position and speed of the ship.

The view seen from a control bridge is an environmental condition obviously difficult to reproduce. The impression of space necessary for realistic training can be given only by means of wide-angle images seen from large distances. The field of vision should also be as large as possible in bearing, i.e. in the horizontal plane. Vertically, however, if it is assumed that large ships remain at adequate distances from the shore, a field of vision defined by an elevation angle of approximately 10° above the horizon would appear to be adequate.

In certain known solutions proposed for training systems, the simulated control station is surrounded by screens, either reflecting or translucent, onto which luminous images are projected edge-to-edge. If required, these images are viewed through refractive optical devices of large size placed in front of these images, which are thus collimated to infinity.

The device often proposed and consisting of a spherical concave mirror with a real image located in the focal plane of this mirror produces a virtual image at infinity. The size of this image can only be, however, relatively small if good image quality and reasonable mirror dimensions are required. An assembly of such devices in a manner enabling several individual images to be juxtaposed can result in a virtual image at infinity and having a wide angle of view.

One of the qualities required of the panoramic image and consequently of each of the individual images is to be evolutive and capable of being processed by, for example, known overlay processes as a function of the ship's movement. At the present time, the only equipment commercially available and capable of producing such evolutive images is based on the use of cathode-ray tube image generators of the television monitor type.

Ingenious arrangements must thus be found for juxtaposing the individual images produced by a set of monitors in order to form a panoramic image without discontinuity in spite of, amongst other problems, the marginal areas of the monitors, visible from a sufficiently large viewing area inside the simulated control station.

The American Pat. No. 3,659,920 (published in France under the Pat. No. 2,103,554) relates to an image generating system consisting of distinct assemblies juxtaposed and oriented concentrically in elevation and bearing.

Each assembly possesses a concave mirror, a cathode-ray tube and a semi-transparent mirror. The tube centre-line is virtually perpendicular to the main optical axis of the mirror. The individual image produced on the tube is reflected in the focal plane of the concave mirror by means of the semi-transparent plane mirror placed at 45° to both axes. The useful light rays reflected by the concave mirror pass through this semi-transparent mirror, and the image is observed along the main axis of the concave mirror.

The purpose of the system described in this American patent is to obtain amongst other results an image which is correct in the vertical direction by adopting in each assembly components of diminishing size as the elevation angle of the assembly considered increases. The arrangement proposed, however, provides image juxtaposition only for an observer located in the neighborhood of the central point of the system, which constitutes an unacceptable constraint when simulating a ship's control bridge.

The purpose of the present invention is to produce a panoramic image continuous in bearing, independent of the movement of the observer within a space of given dimesions compatible with those of the real control bridge.

The characteristics of the image generating system according to the present invention may be understood from the following description illustrated by 5 pages of 8 figures.

FIG. 1 Diagram illustrating the zone of visibility of the virtual image of an object in a concave mirror.

FIG. 2 Diagram showing the observant position of the area where the images are viewed the source and the illustrated principles used in the system.

FIG. 3 Diagram of the set of virtual images and 1st real image viewed from above.

Figure 1:
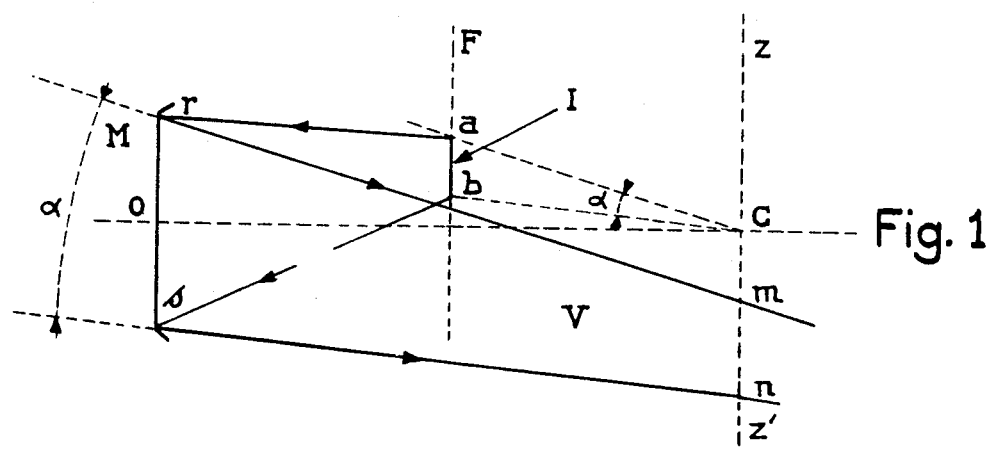

The conventional diagram shown in FIG. 1 determines in terms of geometrical optics the zone of visibility of the virtual image of an object in a concave mirror. The section through an object I in the plane of the figure has the form, for example, of a line ab placed in the focal plane F of a concave mirror M of centre C and main axis OC. The object is offset from this main axis in order to avoid intercepting the useful reflected light rays. The system is such that the virtual image is seen at infinity at an angle $\alpha$, in particular from any point on a straight line mn located on axis zz' passing through C and parallel to the plane F. Amongst other factors, this determines the mirror dimensions. The top edge of the mirror is determined by the reflected ray rm corresponding to the top end of line ab and parallel to the straight line aC. The bottom edge is determined by the reflected ray sn corresponding to the bottom end of line ab and parallel to bC. The zone of visibility V for viewing object I at infinity is thus located in the plane of the figure between the straight lines rm and sn.

Figure 2:
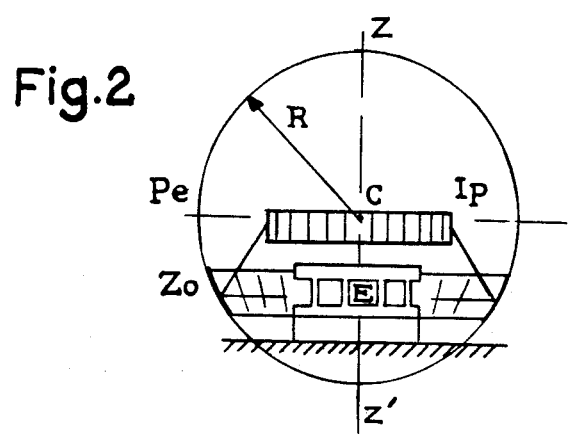

The principle of the system according to the invention is illustrated by FIG. 2. A continuous panoramic image at infinity is obtained from:
- a set of spherical concave mirrors forming a subequatorial reflecting area Zo defined by a virtual sphere of radius R and centre C, the axis of this area constituting the system axis zz',
- a continuous image Ip whose shape may be assimilated i.e., analogous to that of the surface of a virtual truncated prism inscribed within a cylinder, this cylinder being coaxial with the system and possessing a diameter slightly greater than twice the radius R and place approximately at the level of the equatorial plane Pe of the virtual sphere.

The collimated panoramic image seen from the observation space E (that of the control station) is the conjugate of the continuous image by reflection in the reflection area.

Depending on the application, it is seen that the system according to the invention can form a closed ring of 360°, or can be left open to cover an angular sector. If required, the concave mirrors may thus form only a portion or a sector of reflection area. Similarly, the virtual prism may be reduced to a few of its facets. In the following text, references generally refer to a panoramic image with a reflection area and a virtual prismatic area. Moreover, it is seen without going beyond the scope of the invention and in certain cases that the continuous image may be assimilated i.e., analogous not to a prismatic surface but to a pyramidal surface of small apex angle.

Figure 3:
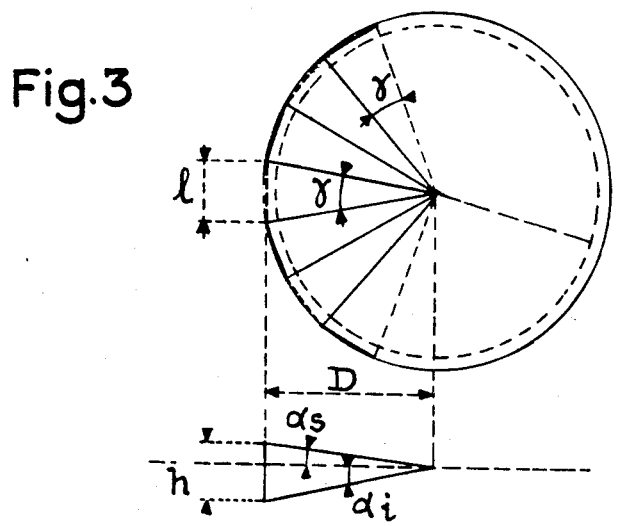
Figure 4:
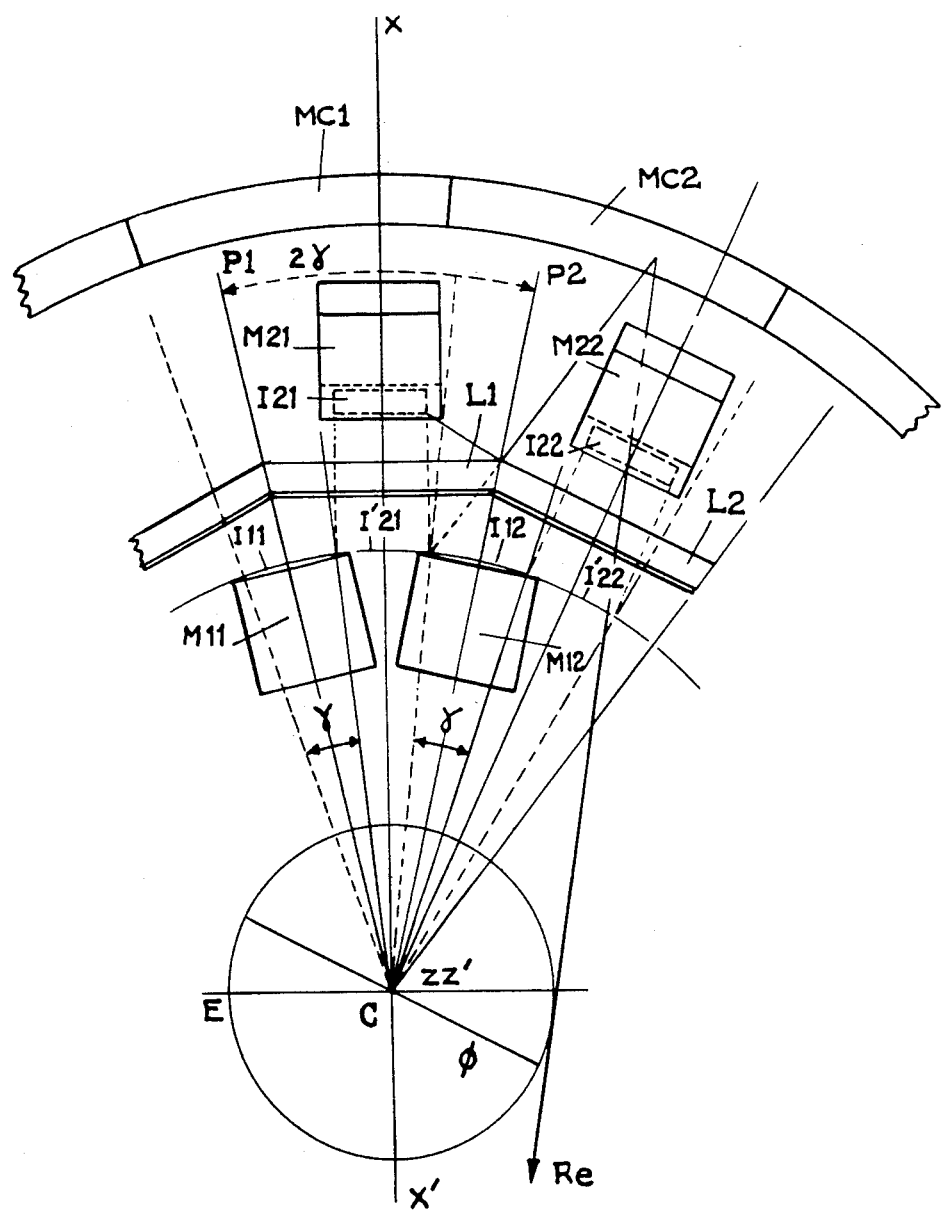
FIGS. 4&5 are top and side views respectively of the image generating system.
Figure 5:
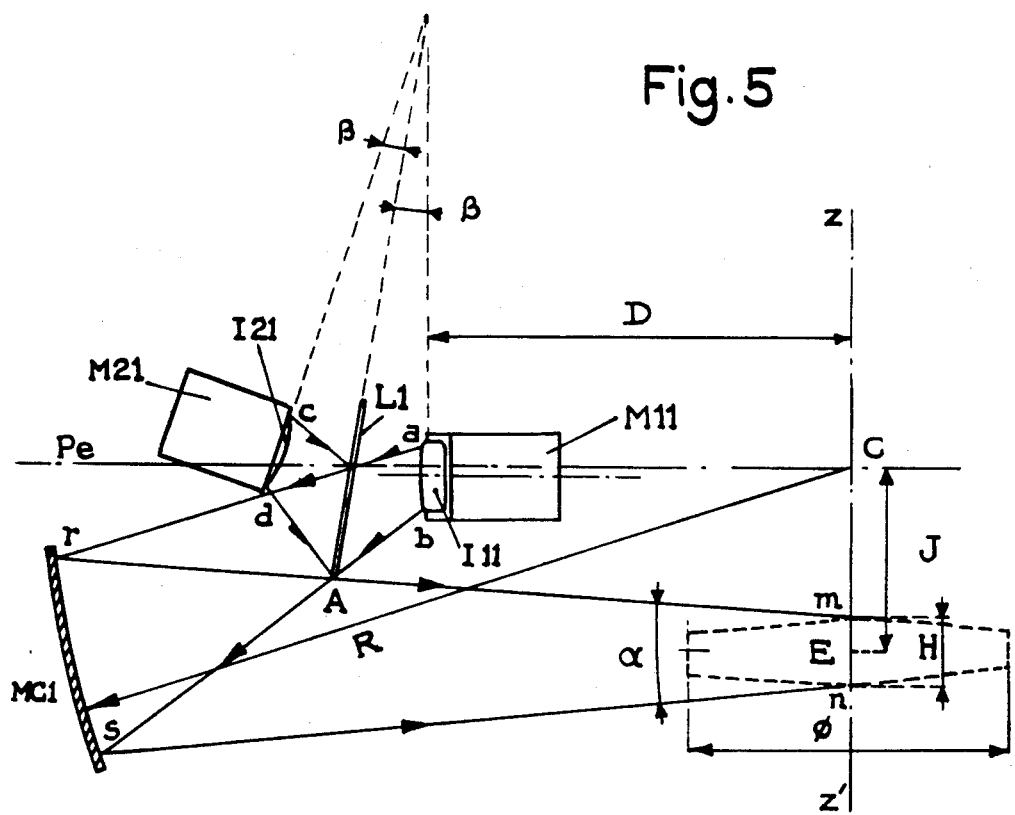

FIGS. 3, 4 and 5 are partial views of a practical example of the image generating system according to the invention. FIG. 4 is a top view showing the circular structure of the system repetitive in bearing. FIG. 5 shows the light paths in elevation in a plane xx' passing through the system axis assumed to be vertical.

In addition to the observation space, the image generating system according to the invention possesses:
- a set of n sperical concave mirrors MC1, MC2, ..., MCn, each having a radius R,
- a set of p first image generators (or first monitors) M11, M12, ..., M1p, whose screens are oriented radially and regularly in an identical manner towards the outside of the system,
- a set of a q semi-transparent plane mirrors L1, L2, ..., Lq of trapezoidal outline,
- a set of q second image generators (or second monitors) M21, M22, ..., M2q, whose screens are oriented towards the centre of the system.

The mirrors are placed edge to edge and form a subequatorial reflection area on a virtual sphere of radius R and centre C.

The first monitors produce the first real images I11, I12, ..., I1p on their screens respectively, which may be assimulated i.e., analagous to p successive facets, odd-numbered for example of a continuous image Ip or of a prismatic surface.

The first real images are viewed from the system axis and in bearing at an angle $\gamma$. Their centres define with the system axis a set of meridional planes P1, P2, ..., Pn.

The semi-transparent plane mirrors are joined along the edges of their trapezoidal outlines. In the case of a closed system, they constitute a regular truncated pyramid, each mirror making an angle $\beta$ with the system axis. In the general case, they may be assimilated i.e., analagous to q successive trapezoidal facets of a virtual pyramid tangential to a cone concentric with the system and possessing a semi-apex angle of $\beta$ (FIG. 5). The edges of each trapezoidal plane mirror lie in two successive meridional planes forming angle of $2\gamma$.

The second monitors produce second real images I21, I22, ..., I2q, whose contours are identical with those of the first real images. These second real images are not visible when viewed from above. They are shown by dashed lines in FIG. 4. The second monitors are oriented such that the second real images are at an angle $\beta$ with the semi-transparent plane mirrors (FIG. 5). A semi-transparent plane mirror is functionally associated with each second monitor, such that there are as many semi-transparent plane mirrors as second image generators. The q second real images thus possess as conjugates by reflection in the semi-transparent plane mirrors q virtual images I'21, I'22, ..., I'2q interspersed continuously between the first real images and which may be assimilated with q successive even-numbered facets of the continuous image Ip or of the prismatic surface.

In FIG. 5, the second monitor M21 and the second real image I21 are seen from the side, the semi-transparent plane mirror L1 and the concave mirror MC1 being shown in section, whilst the first monitor M11 and the first real image I11 are shown as three-quarter views. The edge ab of the virtual image I'21 is seen theoretically and coincident with an edge of the first real image I11. The first monitors are located approximately at the level of the equatorial plane Pe, the first real images being parallel to the axis zz' of the system or virtually parallel, their centres being located slightly beneath this plane. The first and second real images are viewed at an elevation angle $\alpha$ from the observation space E concentric with the system axis and having a height H parallel with the axis and a diameter $\phi$. The useful light rays from the first real images pass through the semi-transparent plane mirrors and are then reflected by the sperical concave mirrors. The useful light rays obtained from the second real images are reflected by the semi-transparent plane mirrors and then by the concave mirrors.

The prismatic surface possesses at least p+q successive facets and the panoramic image results from the juxtaposition of p+q images seen at infinity. These images seen at infinity and considered in bearing are the conjugates by reflection in the reflection area of alternate virtual images and first real images.

The contour C of the images produced by the conventional monitors (FIG. 6) must be corrected such that the first real images and the virtual images join exactly and are rectangular or slightly trapezoidal. This is achieved by conventional electronic correction or the use of masks. For the sake of clarity, all images are considered as being plane.

When the system is a closed ring, the numbers p and q are equal. If the system is an open sector, it is preferable for the number q to be equal to p+1. A preferred practical version thus possesses only one first generator, two semi-transparent plane mirrors and two second generators.

In order to facilitate manufacture, the number of mirrors n may differ from numbers p and q and in general exceed the latter.

The diameter $\phi$ is determined by a conventional geometrical construction not shown having an extreme radius Re (FIG. 4) to a bottom corner of a second real image and which reflects on the bottom corner of the semi-transparent plane mirror corresponding to this second real image.

When the system is an open sector, the angle $\gamma$ may or may not be a whole fraction of $2\pi$ radious.

It is obvious that the system can be oriented in any direction in space. An arrangement inverted with respect to that described above and in which the components are located beneath the reflected rays and consequently nearer the floor may be advantageous.

The laws of geometrical optics cannot be applied to determine the positions of the system components in accordance with the invention because of the dimensions of these components and the already considerable value required for angle $\alpha$. Small angles of reflection on the mirrors in order to approach the ideal optical conditions and limit distortion cannot be achieved except by grouping if possible all components close to the equatorial plane.

The dimensions to be determined depend on many parameters such as the dimensions of the observation space, the dimensions of the monitor screens and the required quality of the panoramic image.

In general, distortion and variations in the distance of the panoramic image as a function of changes in the position of the observer decrease as the mirror radii increase. For a given mirror radius, distortion and image distance variations increase as the observation point moves away from the equatorial plane.

The system parameters may determined roughly and by successive approximation by means of a graphical construction in a plane xx' similar to that of FIG. 5. Since the eyes of the observer are located in two distinct vertical planes, however, the real optimum position of components may slightly differ from the theoretical position found.

The solution may be found more easily by using a well known mathematical curve known as a caustic curve. For any plane passing through the centre of a spherical concave mirror and for a given direction in this plane, the caustic curve is the envelope after reflection in the mirror of rays incident in this plane and parallel to the direction considered.

Figure 7:
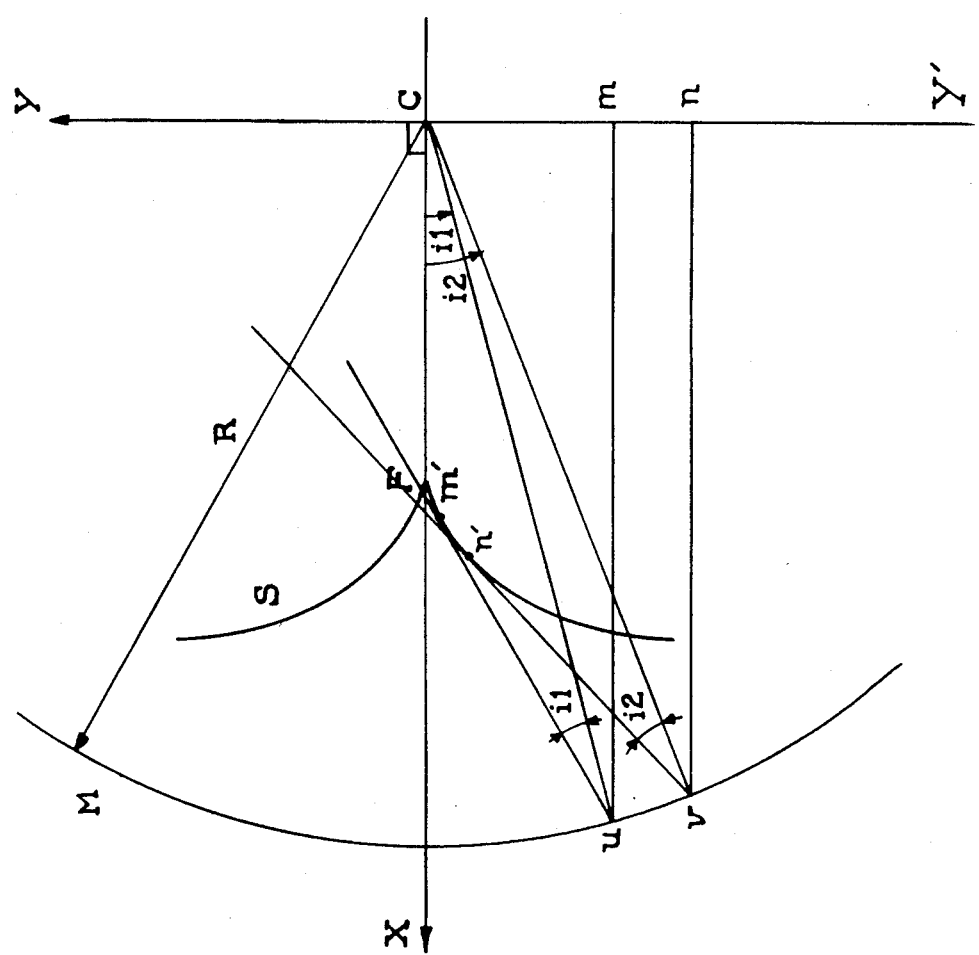
FIG. 7 illustrates a section of a curve that illustrates an aspect of the system.

FIG. 7 shows the section of a caustic curve S corresponding to the rays incident on a mirror M of centre C in a direction parallel to an axis CX and close to this axis. The curve is symmetrical about the axis and possesses a cusp at F half-way between the mirror surface and the centre C. The bottom half of the curve only is of interest for the required construction, since it corresponds to incident rays located beneath the axis CX, i.e. beneath the equatorial plane. The tangent points m' and n' on curve S correspond to the incident rays mu and nv respectively. A point on line CY' thus corresponds to a point on the curve. The curve and line CY' can be graduated in a homologous manner as a function of the angle of incidence i. The parametric equations of this curve are:

$$2X = R \cos i \, (3 - 2 \cos^2 i)$$

$$2Y' = 2 R \sin^3 i$$

FIG. 3 represents the set of virtual images and first real images viewed from above, juxtaposed in a circle and edge-to-edge at a distance D from the axis zz' of the system. The distance D of a virtual image or a first real image may be evaluated by successive approximation from the following expressions:

$$h/l = \tfrac{3}{4}$$

where $$\gamma = 4/3\alpha$$

and $$N\gamma = 2\pi$$

$$l = 2 D \tan(\gamma/2)$$

Figure 6:
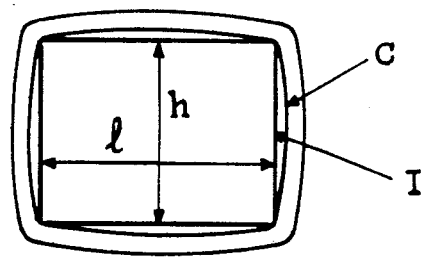
FIG. 6 is a plane view of a monitor.

N being the total number of monitors (in the case of a closed-circle system)

and $\tfrac{3}{4}$ being the usual commercial ratio between h and l (FIG. 6).

The angle of vision $\alpha$ in elevation is then divided into an angle above the horizon $\alpha_s$ and an angle below the horizon $\alpha_i$:

$$\alpha = \alpha_i + \alpha_s$$

Figure 8:
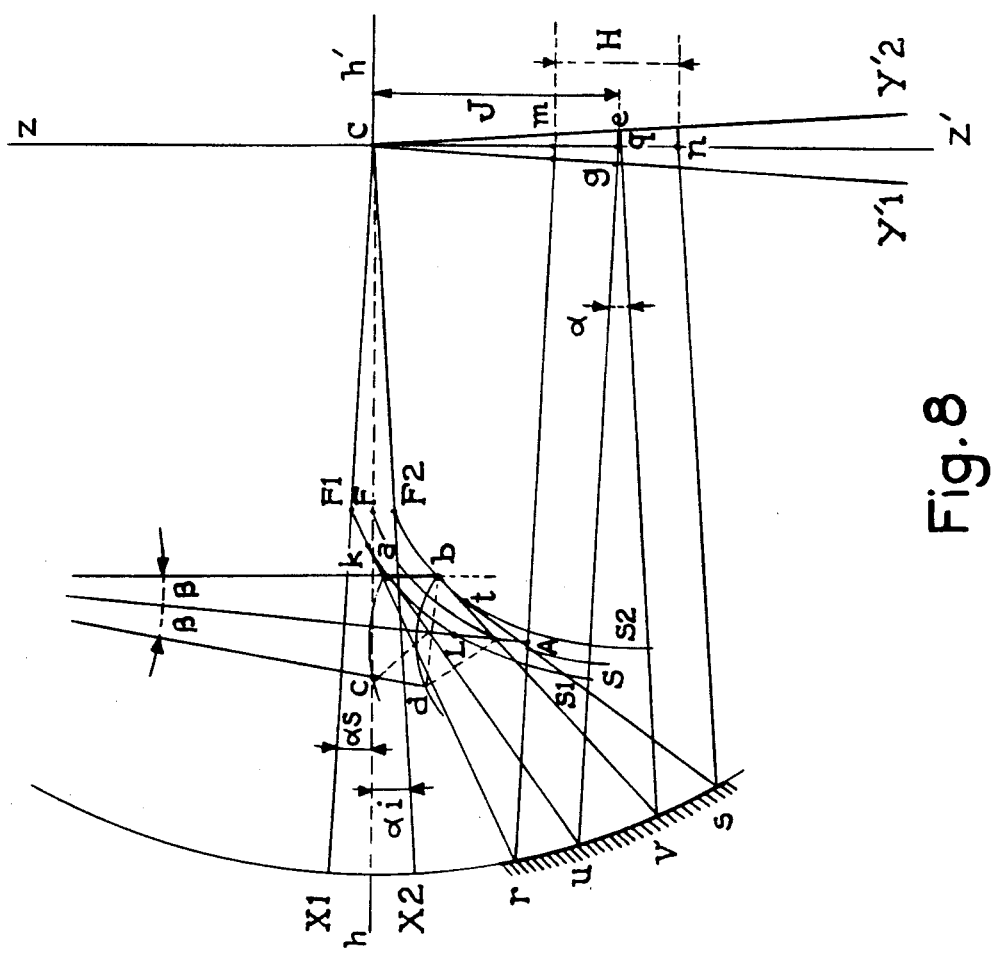
FIG. 8 is a graphical construction useful in determining the location of the parts system.

The graphical construction shown in FIG. 8 can be used for determining roughly and by successive approximation the position of the first monitors with respect to the equatorial plane, the value of R, the average distance J and the height H of the observation space, the positions of the semi-transparent mirrors, the angle $\beta$ as well as the angular field of the mirrors in elevation.

This construction consists first in superposing in the same drawing two identical caustic curves such as that of FIG. 7, shifting them angularly, one by an angle $\alpha_i$ and the other by an angle $\alpha_s$ with respect to rectangular axes zz' and hh' intersection at C. The radius of the circular arc is arbitrary. The straight line representing a virtual image seen from the side and which is limited by the curves S1 and S2 at a and b is drawn parallel to axis zz' close to points F1 and F2. The distance between this line ab and these points is exagerated in FIG. 8 for the sake of clarity of this small-scale drawing. Points a and b belong to curves S1 and S2 respectively. Their coordinates with respect to the sets of axes X1,Y'1 and X2,Y'2 (or the graduations pertaining to each curve) make it possible to determine the angles of incidence on the mirror of the rays tangential to the curves at a and b, the two reflection points u and v, as well as points g and e on axes CY'1 and CY'2. To a fair approximation, point q on Cz' between g and e is a point from which line ab is seen at an angle $\alpha$. This point q defines the average distance J of the observation space from the equatorial plane. A line mn representing the required height H of the observation space is marked on axis Cz' at equal distances either side of q. Its length is initially arbitrary or a function of the previous attempts, since the distance Cn must not exceed R/4 if excessive image distortion is to be avoided. Rays mr and ns parallel to CX1 and CX2 respectively constitute the observation space limits. Points k and t on curves S1 and S2 correspond to these limits. These points should be as close as possible to points a and b. This condition is the more satisfied as line ab approaches points F1 and F2. Rays mr and st determine the position of the semi-transparent plane mirror L. The point of intersection A of the base of this plane mirror with the plane of the figure should be located as far as possible to the left above ray mr and below ray st.

It then remains to check for this point A that a semi-transparent plane mirror inclination angle $\beta$ and a position for the second real image represented by line cd are possible.

This is determined by drawing a circular arc of radius Ab and centered on A, checking that this arc passes above ray rk. If this is not possible, either the height H must be reduced or points F1 and F2 must be moved further away, line ab representing the virtual image. In order to obtain suitable angles of incidence of the rays on the semi-transparent mirror L, it may be preferable for point d to be as far as possible from point b on the arc of radius Ab. The optimum construction corresponds to a circular arc approximately tangential to ray rk.

The semi-transparent plane mirror can then be drawn perpendicularly to line db, and must obviously intercept ray rk. The value of radius R is given by the scale of the figure, which is determined by the ratio between the distance of line ab from axis zz' and the previously specified value of D.

Although the principles of the present invention are described above in relation with specific practical examples, it should be clearly understood that the said description is given as an example only and does not limit the scope of the invention.

We claim:

1. Apparatus for generating an uninterrupted evolutive panoramic image comprising:
   a plurality of first television monitors, evenly set in an arc of a first circle, with their screens outwardly oriented and equally distant from the axis of said first circle, for generating separated portions of a prismatic image of an evolutive panorama;
   a plurality of second television monitors, identical to the first ones and evenly set in an arc of a second circle larger than said first circle, with their screens inwardly oriented and each oriented to the gap between successive ones of said first television monitors, for generating missing portions of said prismatic image corresponding to the missing parts of said panorama;
   a plurality of semi-transparent plane mirrors joined edge to edge and inserted between the screens of said first and said second television monitors and inwardly bent for combining said separated and said missing portions of image in an uninterrupted prismatic image, observable from the outside of said semi-transparent plane mirrors;
   a plurality of concave mirrors juxtaposed in a section limited in width of a reflecting subequatorial zone centred on said axis and located farther from it than said second television monitors, for creating an uninterrupted evolutive panoramic image seen at infinity in said reflecting zone from an inner and limited observation region which surrounds said axis by means of a reflexion of said uninterrupted prismatic image in said reflecting means.

2. Apparatus according to claim 1 wherein the screens of said first and said second television monitors are staggered (i.e. in quincunx) between themselves each screen facing the gap between the two nearest screens situated on the other side of said semi-transparent mirrors.

3. Apparatus according to claim 2 wherein the distance between the screens of two successive first television monitors is equal to the length of the screen of the second television monitor facing them.

4. Apparatus for generating an uninterrupted evolutive panoramic image comprising:
   a plurality of first television monitors evenly set in a first circle, with their screens outwardly oriented and equally distant from the axis of said first circle, for generating separated portions of a prismatic image of an evolutive panorama;
   a plurality of second television monitors evenly set in a second circle larger than said first circle, with their screens inwardly oriented and each oriented to the gap between the next two said first television monitors, for generating missing portions of said prismatic image corresponding to the missing parts of said panorama;
   a plurality of semi-transparent plane mirrors joined edge to edge and inserted between the screens of said first and said second television monitors and inwardly bent for combining said separated and said missing portions of image in an uninterrupted prismatic image, observable from the outside of said semi-transparent plane mirrors;
   a plurality of concave mirrors juxtaposed in a reflecting subequatorial zone centred on said axis and located farther from it than said second television monitors, for creating an uninterrupted evolutive panoramic image seen at infinity in said reflecting zone from an inner and limited observation region which surrounds said axis by means of a reflexion of said uninterrupted convex evolutive panoramic image in said reflecting means.

* * * * *